United States Patent
Goldman et al.

(10) Patent No.: US 11,634,224 B2
(45) Date of Patent: Apr. 25, 2023

(54) AERIAL DELIVERY OF CHEMICALS FOR SWIMMING POOLS AND SPAS

(71) Applicant: ZODIAC POOL SYSTEMS LLC, Carlsbad, CA (US)

(72) Inventors: David Goldman, Carlsbad, CA (US); Eugene Keith McQueen, Vista, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 350 days.

(21) Appl. No.: 16/890,857

(22) Filed: Jun. 2, 2020

(65) Prior Publication Data
US 2020/0377213 A1   Dec. 3, 2020

Related U.S. Application Data

(60) Provisional application No. 62/856,307, filed on Jun. 3, 2019.

(51) Int. Cl.
| | |
|---|---|
| *B64C 39/02* | (2023.01) |
| *B64D 1/00* | (2006.01) |
| *B64D 1/02* | (2006.01) |
| *B64D 1/22* | (2006.01) |
| *G05D 1/00* | (2006.01) |
| *C02F 1/00* | (2023.01) |
| *B64D 1/16* | (2006.01) |

(52) U.S. Cl.
CPC ............. *B64C 39/024* (2013.01); *B64D 1/02* (2013.01); *B64D 1/16* (2013.01); *B64D 1/22* (2013.01); *G05D 1/0038* (2013.01); *B64C 2201/127* (2013.01); *B64C 2201/128* (2013.01); *B64C 2201/146* (2013.01)

(58) Field of Classification Search
CPC ............ B64C 39/024; B64C 2201/127; B64C 2201/128; B64C 2201/146; B64C 2201/024; B64C 2201/027; B64C 2201/12; B64C 2201/14; B64C 39/02; B64D 1/02; B64D 1/16; B64D 1/22; B64D 1/18; B64D 1/00; G05D 1/0038; G05D 1/0094; G05D 1/00; C02F 1/00
See application file for complete search history.

(56) References Cited

U.S. PATENT DOCUMENTS

| | | | |
|---|---|---|---|
| 6,842,931 B2 | 1/2005 | Porat et al. | |
| 8,128,815 B1 * | 3/2012 | Simmons | A01K 63/10 |
| | | | 210/167.16 |
| 10,510,036 B1 * | 12/2019 | Lisso | B65B 35/56 |
| 10,934,184 B2 * | 3/2021 | Denkewicz, Jr. | B64C 39/02 |
| 2003/0101523 A1 * | 6/2003 | Lepley, Jr. | E04H 4/1636 |
| | | | 15/1.7 |

(Continued)

*Primary Examiner* — Yonel Beaulieu
(74) *Attorney, Agent, or Firm* — Kilpatrick Townsend & Stockton LLP

(57) ABSTRACT

Airborne unmanned autonomous vehicles (UAVs) may be used to hover over swimming pools or spas and dispense chemicals (or other materials or devices) directly thereinto. UAVs alternatively or additionally may include sensors designed to identify certain characteristics of pools or spas or of the water therein. The UAVs further may hover over, or land on, pool pads or other areas adjacent or near a pool or spa to deliver or receive parts or other objects.

16 Claims, 3 Drawing Sheets

Causing an airborne unmanned autonomous vehicle to fly above or near the swimming pool or spa
301

Causing at least one sensor on-board the unmanned autonomous vehicle to sense at least one characteristic of the swimming pool or spa or of water therein.
302

(56) References Cited

U.S. PATENT DOCUMENTS

| | | | |
|---|---|---|---|
| 2006/0254004 A1* | 11/2006 | Fraenkel | E04H 4/1636 15/1.7 |
| 2016/0032604 A1* | 2/2016 | Chen | E04H 4/1636 210/167.16 |
| 2018/0130017 A1 | 5/2018 | Gupte | |
| 2019/0125116 A1 | 5/2019 | Russell | |
| 2020/0257559 A1* | 8/2020 | Suvitie | G06F 9/4881 |

\* cited by examiner

Causing an airborne unmanned autonomous vehicle to fly above or near the swimming pool or spa
201

Causing the airborne unmanned autonomous vehicle to dispense at least one object either into the swimming pool or spa or onto an area near the swimming pool or spa
202

```
┌─────────────────────────────────┐
│  Causing an airborne unmanned   │
│ autonomous vehicle to fly above │
│    or near the swimming pool    │
│            or spa               │
│             301                 │
└─────────────────────────────────┘
```

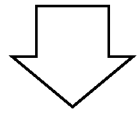

```
┌───────────────────────────────────────┐
│ Causing at least one sensor on-board  │
│ the unmanned autonomous vehicle to    │
│ sense at least one characteristic of  │
│ the swimming pool or spa or of water  │
│              therein.                 │
│                302                    │
└───────────────────────────────────────┘
```

FIG. 3

AERIAL DELIVERY OF CHEMICALS FOR SWIMMING POOLS AND SPAS

CROSS-REFERENCE TO RELATED APPLICATION

This application claims the benefit of and priority to U.S. Provisional Patent Application Ser. No. 62/856,307, filed Jun. 3, 2019, the entire contents of which are hereby incorporated herein by this reference.

FIELD OF THE INVENTION

This invention relates to water-containing vessels such as swimming pools and spas and more particularly, although not necessarily exclusively, to techniques and equipment for aerially delivering products such as (but not limited to) chemicals to such vessels.

BACKGROUND OF THE INVENTION

Water in, especially, outdoor pools and spas is subject to changes in its characteristics over time. Bather load, evaporation, rain fall, and organic debris associated with a pool or spa, for example, may degrade the water quality within the water-containing vessel. Accordingly, many pool owners undertake significant efforts to enhance the water quality of their pools, utilizing manual or automatic cleaners to vacuum or remove debris from the water and chemicals (e.g., chlorine, bromine) to improve its clarity or pH level or inhibit growth of bacteria or algae, for example.

These water-quality enhancement efforts can require substantial time to complete. Some pool owners hence contract with pool-care professionals to take the actions necessary to provide satisfactory quality of the water within their pools. However, these professionals too have limited available time and thus are restricted in the number of swimming pools they may visit in a given period. Alternatively, the professionals may be seeking ways of being more efficient and thus expending less time at each pool or of securing new customers for their services.

Unmanned autonomous vehicles (UAVs), including drones, are being used for various recreational and commercial purposes. Airborne UAVs with cameras may, for example, capture photographs or video images of land, structures, and activities for use by real estate agents, surveyors, construction workers, or otherwise. UAVs also are proposed for use in delivering packages and postal mail. U.S. Patent Application Publication No. 2019/0125116 of Russell describes concepts in which a drone hovers over a cylindrical structure (called a "Drone Pipe") and drops a "Mail Carrier Carton" into the structure. U.S. Patent Application Publication No. 2018/0130017 of Gupte details additional systems and methods of enabling delivery of packages using, e.g., airborne drones.

BRIEF DESCRIPTION OF THE DRAWINGS

FIG. 3 is a flow chart of certain actions associated with a third version of the present invention.

DESCRIPTION OF THE INVENTION

Figure 1:
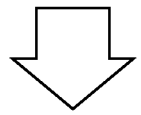
FIG. 1 is a flow chart of certain actions associated with a first version of the present invention.

To applicant's knowledge, UAVs have not previously been used commercially in maintaining swimming pools and spas. Utilizing airborne UAVs could, however, materially benefit such maintenance. In particular, because many swimming pools and spas are normally uncovered (or at least uncovered frequently or occasionally), an airborne UAV could be employed to hover over a pool or spa and dispense chemicals directly thereinto. See FIG. 1, blocks 101 and 102.

Moreover, if a UAV has electronic memory, it may be configured automatically to dispense pre-determined doses of one or more chemicals into a particular pool or spa. Alternatively or additionally, a pool-care professional or other person may signal the UAV and control the chemical dose or doses dispensed into a pool. In either circumstance, if the UAV contains either an image-capture device and transmitter or a guidance system, it may be piloted by someone remote from a particular pool site or even autonomously.

UAVs additionally may include sensors designed to identify certain characteristics of a pool or of the water therein, such as (but not limited to) a size of the swimming pool or spa, a shape of the swimming pool or spa, or a material from which a surface of the swimming pool or spa is made. Oxidation-reduction potential (ORP), pH, chlorine content, alkalinity, or any other aspect of pool or spa water may be sensed if desired. See FIG. 3, blocks 301 and 302. If a UAV contains sensors, a chemical reservoir, and a computerized controller, for example, it may hover over a pool, obtain sensor information, determine a dosage to dispense, and dispense the dosage into the pool—all potentially without human involvement. The UAV alternatively may communicate (via the cellular telephone system, the Internet, satellite, or otherwise) with remote information sources or storage in order to receive or transmit sensed information or dosage determinations, for example.

In some versions of the invention, a pool-care professional pilots an aerial UAV from a location remote from a to-be-dosed pool. For example, the professional may be located on a nearby street. In this manner, he or she need not necessarily access a homeowner's back yard to maintain a pool. Instead, the UAV may do so aerially, transmitting images of (at least) the pool back to the professional for viewing. When a UAV is positioned as desired, it may be signaled to take suitable measurements (if the UAV includes sensors) and to dispense chemicals into the pool. If desired, the UAV may be piloted to return to the pool some time period after dosing to take further measurements or capture or transmit images of the treated pool for review.

Exemplary concepts or combinations of features of the invention may include:

A. A method of dispensing at least one chemical into a swimming pool from an aerial vehicle.

B. A UAV configured to dispense at least one chemical into a swimming pool and/or sense a characteristic of the swimming pool (or the water therein).

C. A method of maintaining a swimming pool comprising piloting a UAV over the swimming pool and signaling the UAV to dispense at least one chemical into the swimming pool.

D. A method according to statement "C" further comprising sensing a characteristic of the swimming pool (or the water therein) using a sensor on-board the UAV.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

Figure 2:
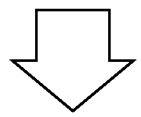
FIG. 2 is a flow chart of certain actions associated with a second version of the present invention.

UAVs additionally or alternatively may dispense objects such as spare parts, components of equipment, or automatic cleaners into or near swimming pools or spas. See FIG. 2, blocks 201 and 202. For example, a UAV could hover over a swimming pool or spa and drop therein a battery-powered automatic cleaner (see, e.g., U.S. Pat. No. 6,842,931 to Porat, et al.) configured to move autonomously within the swimming pool or spa and filter debris from water thereof. If the automatic cleaner is configured to come to the waterline, or to exit the pool or spa, when finished or summoned, it could then be retrieved by the UAV.

The entire contents of the Russell and Gupte applications and the Porat patent are incorporated herein by this reference. Further, although applicant has described UAVs for use in dispensing pool chemicals, persons skilled in the relevant field will recognize that the present invention may be employed in other manners as well (including, for example, in connection with a Drone Pipe such as that of the Russell application). Finally, references to "pools" and "swimming pools" herein may also refer to spas or other water containing vessels used for recreation or therapy and for which maintenance is needed or desired.

What is claimed is:

1. A method of maintaining a swimming pool or spa, comprising: a. causing an airborne unmanned autonomous vehicle to fly above the swimming pool or spa; and b. dispensing at least one chemical, from the unmanned autonomous vehicle flying above the swimming pool or spa, into the swimming pool or spa in order to automatically improve clarity or pH level or inhibit growth of bacteria or algae in the swimming pool or spa water.

2. A method according to claim 1 further comprising loading the at least one chemical on-board the unmanned autonomous vehicle prior to causing it to fly above the swimming pool or spa.

3. A method according to claim 2 further comprising piloting the unmanned autonomous vehicle from a location remote from the swimming pool or spa.

4. A method according to claim 3 in which the act of piloting the unmanned autonomous vehicle is performed by a pilot, further comprising causing the unmanned autonomous vehicle to transmit to the pilot at least one image of the swimming pool or spa.

5. A method of maintaining a swimming pool or spa, comprising: a. causing an airborne unmanned autonomous vehicle to fly above or near the swimming pool or spa; and b. dispensing, from the airborne unmanned autonomous vehicle flying above or near the swimming pool or spa, at least one object either into the swimming pool or spa or onto an area near the swimming pool or spa in order to automatically improve clarity or pH level or inhibit growth of bacteria or algae in the swimming pool or spa water.

6. A method according to claim 5 in which the at least one object comprises a battery-powered automatic cleaner configured to move autonomously within the swimming pool or spa and filter debris from water of the swimming pool or spa.

7. A method according to claim 6 in which the unmanned autonomous vehicle flies above the swimming pool or spa and dispenses the battery-powered automatic cleaner into the swimming pool or spa.

8. A method according to claim 7 in which the unmanned autonomous vehicle thereafter retrieves the battery-powered automatic cleaner.

9. A method according to claim 5 in which the at least one object comprises equipment associated with the swimming pool or spa.

10. A method of maintaining a swimming pool or spa, comprising: a. causing an airborne unmanned autonomous vehicle to fly above or near the swimming pool or spa; b. causing at least one sensor on-board the unmanned autonomous vehicle to sense at least one characteristic of the swimming pool or spa or of water therein; c. causing determination of a dosage of at least one chemical to dispense into the swimming pool or spa based on the at least one characteristic sensed by the at least one on-board sensor; and d. dispensing, from the unmanned autonomous vehicle flying above the swimming pool or spa, the dosage of the at least one chemical into the swimming pool or spa.

11. A method according to claim 10 in which the at least one characteristic of the swimming pool or spa is selected from the group consisting of a size of the swimming pool or spa; a shape of the swimming pool or spa; or a material from which a surface of the swimming pool or spa is made.

12. A method according to claim 10 further comprising piloting the unmanned autonomous vehicle from a location remote from the swimming pool or spa.

13. A method according to claim 12 in which the act of piloting the unmanned autonomous vehicle is performed by a pilot, further comprising causing the unmanned autonomous vehicle to transmit to the pilot at least one image of the swimming pool or spa.

14. A method according to claim 10 further comprising causing the unmanned autonomous vehicle to communicate with at least one remote information source or storage device.

15. A method of maintaining a swimming pool or spa, comprising: a. causing an airborne unmanned autonomous vehicle to fly above or near the swimming pool or spa; and b. causing the airborne unmanned autonomous vehicle to dispense at least one object either into the swimming pool or spa or onto an area near the swimming pool or spa, wherein the at least one object comprises a battery-powered automatic cleaner configured to move autonomously within the swimming pool or spa and filter debris from water of the swimming pool or spa, and in which the unmanned autonomous vehicle flies above the swimming pool or spa and dispenses the battery-powered automatic cleaner into the swimming pool or spa.

16. A method according to claim 15 in which the unmanned autonomous vehicle thereafter retrieves the battery-powered automatic cleaner.

* * * * *